(12) United States Patent
Loges

(10) Patent No.: US 8,520,477 B2
(45) Date of Patent: Aug. 27, 2013

(54) DISC DRIVE SYSTEM

(75) Inventor: Matthias Loges, Bad Dürrheim (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 0 days.

(21) Appl. No.: 13/455,842

(22) Filed: Apr. 25, 2012

(65) Prior Publication Data

US 2012/0281515 A1 Nov. 8, 2012

(30) Foreign Application Priority Data

May 6, 2011 (EP) .................................... 11003744

(51) Int. Cl.
*G11B 17/22* (2006.01)
*G11B 7/24* (2013.01)

(52) U.S. Cl.
USPC .................... 369/30.03; 369/32.01; 369/187; 369/275.1

(58) Field of Classification Search
None
See application file for complete search history.

(56) References Cited

U.S. PATENT DOCUMENTS

| | | | |
|---|---|---|---|
| 7,975,101 B2* | 7/2011 | Uno | 711/114 |
| 7,983,522 B2* | 7/2011 | Battaglia et al. | 386/224 |
| 2008/0253254 A1 | 10/2008 | Onishi | |
| 2009/0165028 A1 | 6/2009 | Wu | |

OTHER PUBLICATIONS

European Search Report for European Application No. EP 11003744.7 dated Sep. 2, 2011, 6 pages.

* cited by examiner

*Primary Examiner* — Muhammad N Edun
(74) *Attorney, Agent, or Firm* — Brinks Hofer Gilson & Lione

(57) ABSTRACT

A disc drive may provide data communications to a host using a universal serial bus ("USB") interface. Activation of the USB interface may be triggered upon insertion of a disc into the disc drive. A connection unit may activate the USB interface by providing power to the USB interface when a disc switch detects that the disc has been inserted into the disc drive. The connection unit may deactivate the USB interface by no longer providing power to the USB interface when the disc switch detects that the disc has been ejected or no longer is in the disc drive.

25 Claims, 6 Drawing Sheets

US 8,520,477 B2

DISC DRIVE SYSTEM

BACKGROUND OF THE INVENTION

1. Priority Claim

This application claims the benefit of priority from European Patent Application No. 11003744.7 titled "Optical Disc Drive with USB Interface," filed May 6, 2011, which is incorporated by reference.

2. Technical Field

The present description generally relates to a disc drive for an optical disc. More specifically, the present description relates to an optical disc drive operable for automotive use.

3. Related Art

Optical storage media, such as optical discs, may be used in various fields. Optical discs may, for example, be used with automotive systems, consumer electronics ("CE"), and computer technology. For example, in an automotive system, audio, video, or audio/video ("AV") data may be transferred between an optical disc and vehicular equipment, such as a navigation system, for reproduction or storage.

SUMMARY

A disc drive, such as an optical disc drive for use in a vehicle, may engage in data communications with a host, such as a head unit in the vehicle. The disc drive and the host may communicate using a universal serial bus ("USB") interface. The disc drive may detect when a disc is inserted into the disc drive using a disc switch. The disc drive may include a connection unit that may activate the USB interface by providing power to the USB interface when the disc switch detects that the disc has been inserted into the disc drive. Signals and data may be passed between the host and a drive controller, such as a drive controller having an Advanced Technology Attachment ("ATA") interface, using the connection unit. The connection unit may convert signals between the USB interface and the drive controller. The connection unit may deactivate the USB interface by no longer providing power to the USB interface when the disc switch detects that the disc has been ejected or no longer is in the disc drive.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
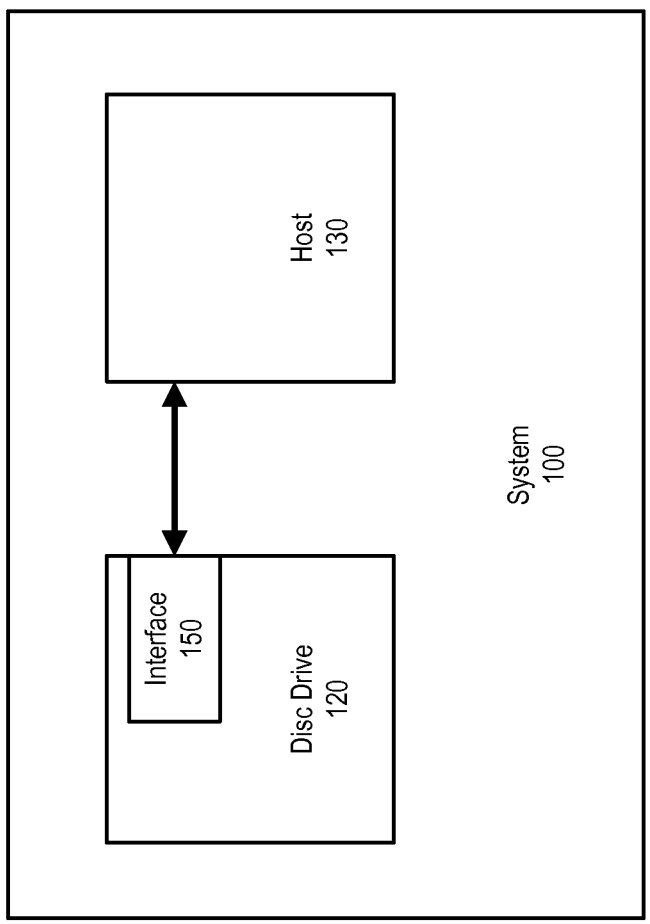
FIG. 1 is a block diagram of an example of a system with a disc drive.

FIG. 1 is a block diagram of an example system 100 for processing data or information associated with a storage media. The system 100 may include a disc drive 120 (sometimes referred to as a "drive unit") and a host 130. The disc drive 120 may read data from, or write data to, an optical storage media. The disc drive 120 may, for example, be an optical disc drive or other drive unit. Some examples of optical disc drives 120 may include consumer electronics such as a CD-player, DVD-player, or blu-ray player, a computer, a processor, or various other devices. The disk drive 120 may include a computer-readable medium in which one or more sets of instructions or software may be embedded. The instructions may embody one or more of the methods or logic described, and may reside completely, or partially, within memory or within a processor during execution.

The disc drive 120 may be in communication with the host 130, such as by or through an interface 150. The host 130 may control one or more aspects or functions of the disc drive 120. The system 100 may represent various systems or environments, such as, but not limited to, an automobile or vehicular audio/video system, a computer such as a laptop or desktop computer, a processor or processing system, a home entertainment system, or various other systems or environments.

The storage media may be an optical storage media, such as optical discs, and may store or hold data or other information. Examples of optical storage media may include a compact disc ("CD"), a digital versatile disc ("DVD"), a blu-ray disc ("BD") or various other optical discs or media. For simplicity, the storage media may be referred to as an optical disc, and the disc drive referred to as an optical disc drive. However, it should be appreciated that storage media may be or include various other optical or other storage media, and the disc drive may be or include various other disc drives.

Optical storage media may be grouped, referred to, or classified based on one or more characteristics or capabilities of the optical storage media. Optical storage media may be characterized according to a capability of a device to record, read-only, write, or re-write data to or from the optical storage media. For example, an optical storage media such as an optical disc may be classified into one or more categories, such as read-only-memory ("ROM"), recordable ("R"), readable/writeable ("RW"), or random access memory ("RAM").

The optical disc drive 120 of system 100 may be operable or configured to receive an optical disc. For example, some optical disc drives 120 may include a tray, such as a laterally moveable tray-like portion of a computer drive. Other optical disc drives 120, such as smaller optical disc drives used in or with vehicles, may receive an optical disc using a loading mechanism or component.

The optical disc drive 120 may convert data read from an optical disc into reproducible data. The optical disc drive 120 may additionally or alternatively convert or write reproducible data to the optical disc. For example, the optical disc drive 120 may include an optical pickup component that may read from or write to the optical disc inserted in the drive unit. The optical pickup component may perform reading or writing functions with, according to, or based on laser technology.

The optical disc drive 120 may communicate with a host 130. The host 130 may be a processor, computer mainboard having a processor, a head unit ("HU") in a vehicle, or various other computing or controlling modules.

In a vehicle, a host 130, such as the head unit, may be arranged near the driver's operation panel (such as a dashboard of the vehicle). The host or head unit may include a processor or central processing unit ("CPU"). The CPU may, for example, control an operation of the disc drive and the components of a vehicle entertainment and information system for which the disc drive is provided. The head unit or host 130 may also or alternatively include respective operational elements by which a driver or other passengers sitting in the vehicle may operate the host or head unit.

The host 130 may control an operation of the optical disc drive 120. The host 130 may also or alternatively control a processing of data read out by an optical pickup component of the optical disc drive 120. For example, a CPU of the host 130 may control some or all reading or decoding of the disc drive 120. The CPU may also or alternatively control some or all other functions within the head unit, such as audio-streaming, navigation, or source-switching.

The optical disc drive 120 may communicate with or be connected to the host 130 in various ways. The optical disc drive 120 may include a drive controller configured or operable to control a data communication with the optical disc drive 120 and the host 130. The drive controller or the optical disc drive 120 may include an interface 150 that may be used to connect the optical disc drive 120 to the host 130. For example, in multi-purpose applications such as those for computer systems, a ROM disc drive may be employed, which may include an interface 150 to the computer or main processor. The interface 150 may be operable or configured to interconnect or communicate with various kinds of storage devices in addition to optical disc drives, such as hard discs, solid-state drives or floppy drives.

The interface 150 may be configured or made according to a standard known as Advanced Technology Attachment ("ATA"). An ATA interface may, for example, be based on an Integrated Drive Electronics ("IDE") interface or an enhanced IDE ("EIDE") interface originally introduced by Western Digital. An example of a software protocol associated with an ATA interface may be an Advanced Technology Attachment with Packet Interface ("ATAPI"). Many variations of ATA interface may exist, including a parallel ATA ("PATA") interface, a serial ATA ("SATA") interface, an external SATA ("eSATA"), or a power over eSATA ("eS-ATAp"). An ATA interface may include or require a complicated wire structure with, for example, 30 to 50 pins. The drive controller of the optical disc drive may be configured or operable to connect with or otherwise communicate through or using an ATA interface.

The interface 150 may additionally or alternatively be configured or otherwise include a universal serial bus ("USB") interface that may connect the optical disc drive 120 of a system 100 (such as a computer) with a host 130 of the system 100. A USB interface may be useful and advantageous for connected a host 130 of a computer with an external optical disc drive 120. For example, a USB interface 150 may enable the installation and removal of devices connected via USB without rebooting the computer (also referred to as "hot-swapping"). A USB interface may also provide an advantage in that the USB interface may be used as an interface for many different kinds of peripheral devices, such as USB mass-storage devices, flash drives, printers, scanners, cameras, and others. In some systems, however, the drive controller may not be configured or operable to include a USB interface.

The system 100 may be configured to be operable by a user, without requiring the handling of a large number of user steps. For example, automotive disc drives may be arranged in such a way that the disc drive 120 and head unit 130 may be automatically activated upon the insertion of a disc. Such operation may be performed without excessively distracting a driver from controlling the vehicle.

Figure 2:
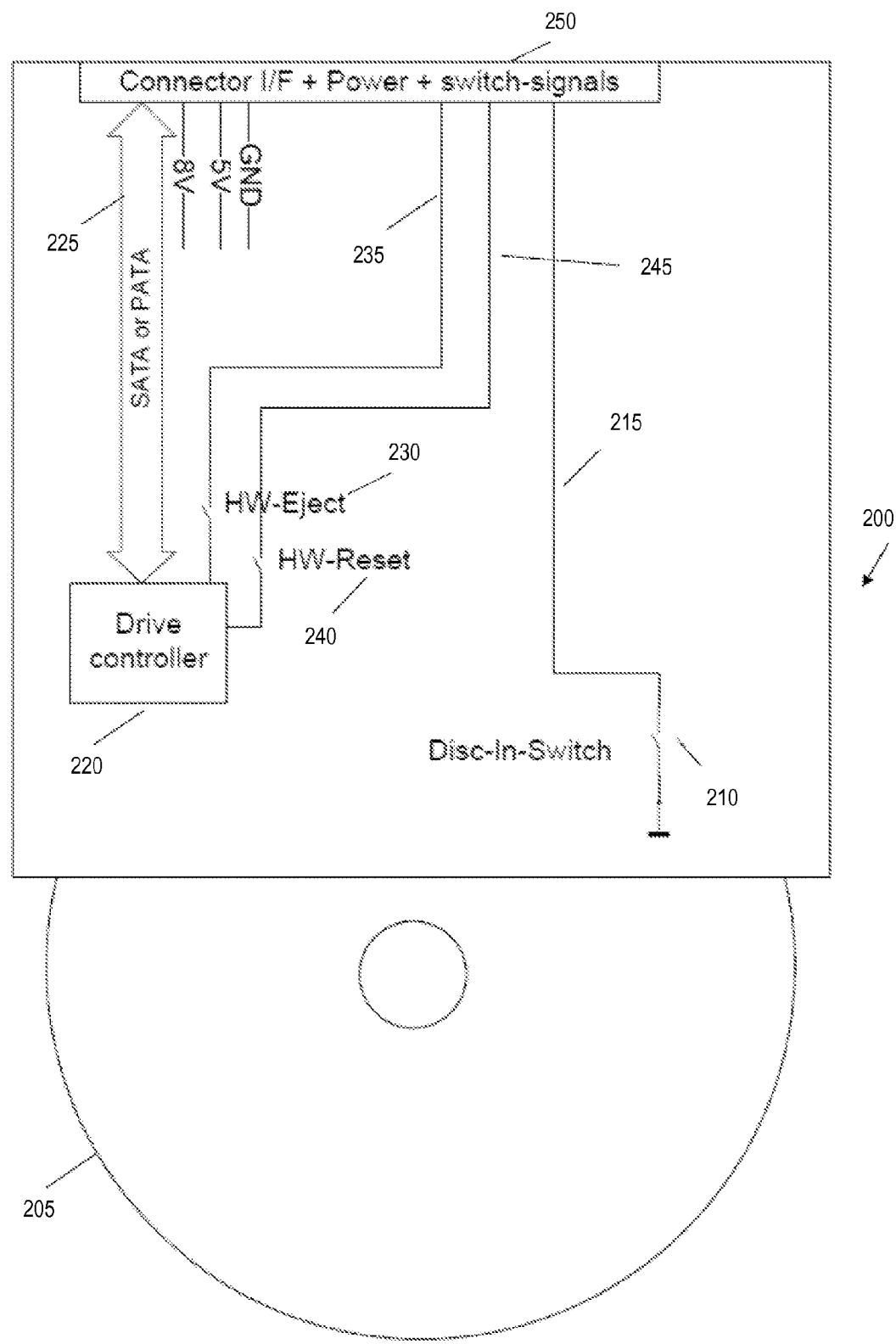
FIG. 2 is a block diagram of an example of a disc drive.

FIG. 2 is a block diagram of a disc drive 200. The disc drive 200 may be similar to, the same as, or different from the optical disc drive 120. The disc drive 200 may be or represent a disc drive in various systems 100, such as an optical disc drive in an automobile or other vehicle. Alternatively, the disc drive 200 may be a disc drive 200 in various other system or settings, such as an optical disc drive of a computer system or a home entertainment system. The disc drive 200 may, for example, be a CD-drive, a DVD-drive, a BD-drive, or various other drives configured or operable to read from or write to an optical storage media.

The disc drive 200 may be in communication with a host, such as a head unit or host 130. The disc drive 200 may include a loading mechanism with a slot for receiving an inserted optical disc 205.

The disc drive 200 may additionally or alternatively include a drive controller 220. The drive controller 220 may be configured or operable to control part or all of the disc drive 200. The drive controller 200 may be configured or operable to control a data communication between the disc drive 200 and the host 130.

Data may be communicated between the drive controller and the host 130 through a communication line 225 which may connect with a connection interface 250. the connection interface 250 may be or include an ATA interface, such as a serial or parallel ATA interface. The communication line 225 may be or include one or more SATA or PATA cables. The drive controller 220 may include or communicate through the ATA interface 250, and may control a data communication between the disc drive 200 and a host in accordance with or in one or more ATA formats, such as with or in a SATA or PATA format. The communication line 225 may transmit data according to one or more SATA or PATA formats.

The disc drive 200, and the drive controller 220, may receive or be supplied with power (such as "8V," "5V," and "GND") from the host 130, such as a head unit in a vehicle. The host 130 may supply power through the same connector interface 250 or a different interface 250. The 8 volt ("V") power supply may be controlled to be switched off by or from the host 130. While the power supply is shown by the electric lines labeled "8V", "5V" and "GND" designating supply voltages of 8V and 5V and "ground," respectively, various other voltages are possible beyond those mentioned. For example, in other disc drives 200, instead of the 5V power supply, a supply voltage of 3.3V may be used. Other variations are possible.

The disc drive 200 may include a switch, such as a disc-in switch 210. The disc-in switch 210 may be a switch or other circuitry which may be configured or operable to detect the presence of a disc 205, such as an optical disc, in the disc drive 200. The disc-in switch 210 may connected or be in communication with the head unit or host 130 through interface 250 by a wire or communication line or link 215. A disc-in switch 210 may be particularly useful, for example, in an automotive disc drive 200.

The disc-in switch 210 may be operable or configured to detect an insertion or presence of an optical disc 205 when, or as soon as, an optical disc 205 is inserted into the slot of the disc drive 200. The disc-in switch 210 may provide a mechanical or electrical based disc status indication to the head unit or host 130, such as a contact closure, a change in current or voltage, or any other parameter capable of being moved between two states. In one example, the disc-in switch may be in an open or disconnected orientation or position when no disc is in the disc drive 200, or after a disc has been ejected from the disc drive 200. The disc-in switch 210 may close when a disc 205 is inserted in the disc drive 200 and may remain in a closed orientation or position while the disc 205 is in the disc drive 200. The orientation or position of the disc-in switch 210 may indicate to the host 130 when a disc is in the disc drive 200, which may trigger various other functions to occur at the head unit or host 130.

An extra conductor may be provided for connecting the disc-in switch 210 with the host 130 via a SATA/PATA compatible plug so as to detect insertion of a disc into the disc drive 200. Extra wiring (additional to the standard PATA/SATA lines) may be necessary for implementing the wake-up functionality of the host.

A disc-in switch 210 may not require power from the disc drive 200 to detect insertion or the presence of an optical disc 205. The host 130 may interrogate or otherwise monitor a status of the switch 210. When the host 130 detects that a level change of the switch 210 has changed, a wake-up process or start-up process for the disc drive 200 may be started. Additionally or alternatively, when the host 130 detects that a level change of the switch 210 has changed, a wake-up process or start-up process for the host or head unit may started. Some hosts or vehicle head units may include a processor that may remain active while the rest of host 130 is in standby, and may perform the interrogation or monitoring of a status of the disc-in switch 210. Such hosts 130 may avoid high standby power consumption. In some systems, the power supply to the drive (8V) may be switched on, the head unit may remain dormant or in standby state and switches to the CD-DVD-/PD-drive as a source, or both may occur.

The interface 250 may also or alternatively include one or more connections, wires, or communication lines or links 235 and 245, which may configured or operable to provide commands or signals to the drive controller 220 from the host 130. For example, a hardware eject signal or command 230 may be sent along communication line 235 from the head unit or host 130, through the interface 250, to the drive controller 220. The hardware eject signal or command may instruct the drive controller 220, in case of an error, independent of any current bus activity, to perform or enable an ejection of the optical disc 205 from the disc drive 200. A hardware reset signal or command 240 may be sent along communication line 245 from the head unit or host 130, through the interface 250, to the drive controller 220. The hardware reset signal or command 240 may instruct the drive controller 220, independent of any current bus activity, to perform or enable a hardware reset of the disc drive 200. One or both of the commands 230 and 240 may be controlled, issued, or otherwise provided from the head unit or host 130.

Disc drives with drive controllers 220 connected to a head unit or host 130 via a parallel or serial ATA (PATA or SATA) interface, such as by the communication line 225 and interface 250, may be used in some systems 100, such as in automobiles or vehicular systems. In some of these systems 100, head units or other hosts 130 may be small or decreasing in dimension. As a result of the reduction in the size of a host or head unit 130 in some of these systems, there may be an insufficient space for arranging a disc drive 200 directly in or with the head unit or host 130.

Additionally or alternatively, there may not be a need to place small head units in immediate proximity to a dashboard in a vehicle. In some systems, a disc drive 200 may be located in one location, while a head unit or host 130 may be located in a different location. For example, a disc drive 200 may be located on a dashboard, while a head unit or host 130 may be located in a central console between a driver and passenger seat. Alternatively, a disc drive 200 may be located in a central console, while the head unit is located on or in a steering wheel. In some systems, disc drive 200 may be arranged or configured to be connected to the head unit or host 130 over various distances. For example, in some systems 100, a disc drive 200 may need to be placed or located between 1.5 and 3.5 meters from a host 130. In other systems, the disc drive 200 may need to be placed or located distances shorter than 1.5 meters, or longer than 3.5 meters, from a host 130. Various other examples or variations are possible.

Where the disc drive 200 is located a distance away from the head unit or host 130, serial or parallel ATA interfaces may not be suitable or desirable to connect the disc drive 200 and the host 130. For example, an ATA interface including a PATA cable or SATA cable may include a large number of pins (such as 30 for a SATA cable or 50 for a PATA cable). A signal quality of a connection using a PATA cable or a SATA cable may decrease considerably with increasing transmission length. Accordingly, connecting the disc drive 200 with a head unit or host 130 located a distance away using an ATA interface may not be desirable.

A USB interface also may not, by itself, be suitable or desirable to connect a disc drive 200 and a host 130 located a distance apart. For example, the drive controller 220 may be built or operate using an ATA interface and may not be capable or operable to receive a USB connection or directly interface with a USB interface.

Additionally, using only a USB interface may not allow for disc-in recognition functionality to be performed, as the disc-in switch 210 may be connected via a specific wire 215 to a serial or parallel ATA interface 250 between the disc drive 200 and the host 130. While no power may be required from the disc drive 200 for a disc-in switch 210 to detect an insertion or present of an optical disc 205, where the disc drive 200 and the host 130 are connected only with a USB interface 250, the USB interface 250 may not provide any additional wiring or communication line 215 between a disc-in switch 210 and the interface 250. As there is no additional wire for the disc-in-signal generated by the disc-in-switch, disc-in recognition functionality provided by a disc-in switch 210 may not be provided.

Figure 3:
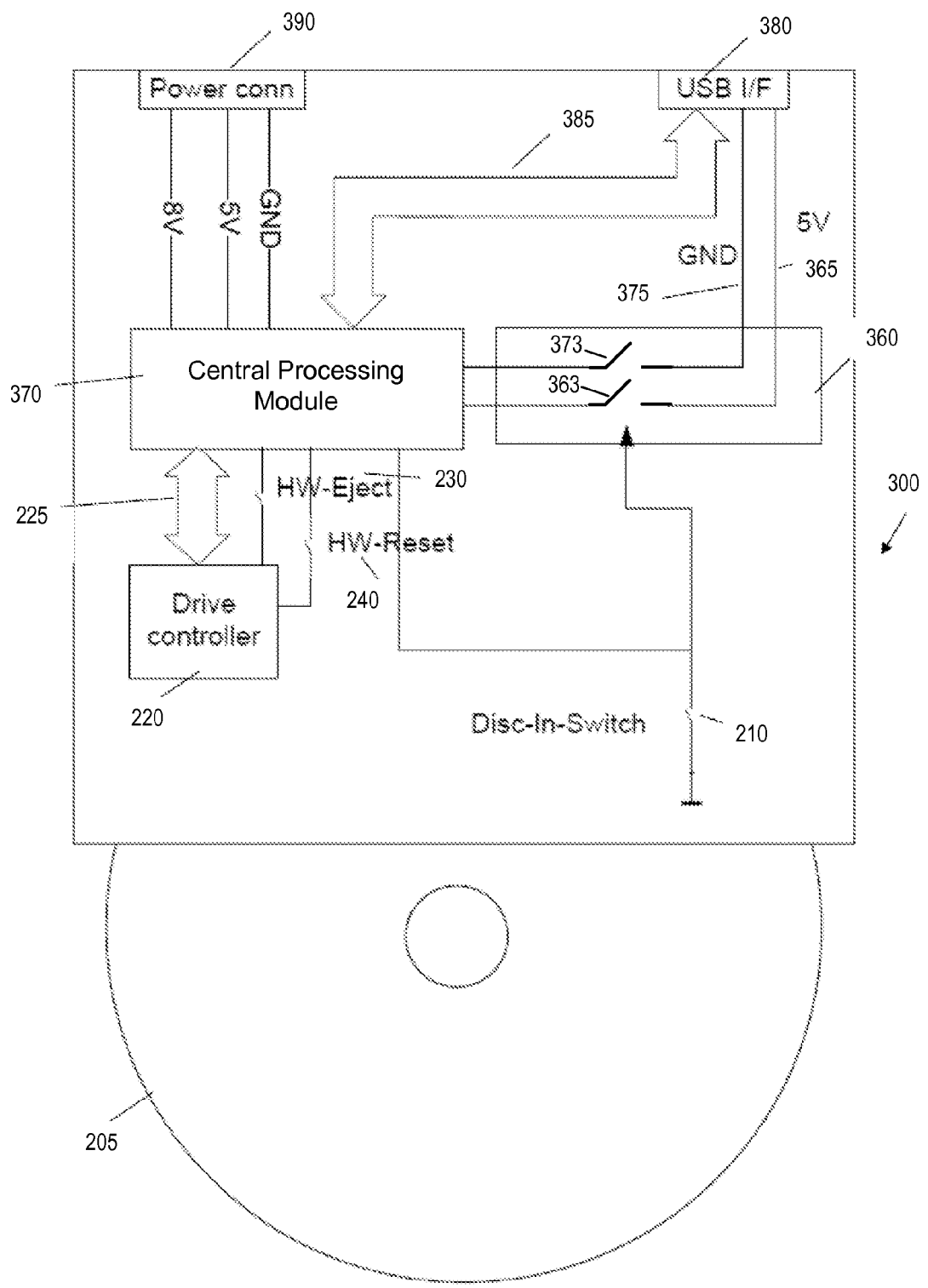
FIG. 3 is a block diagram of an example of a disc drive.

In order to access an ATA-based drive controller 220 using a USB interface, a disc drive may include a conversion unit or conversion circuit. FIG. 3 is a block diagram of an example disc drive 300 that includes a conversion unit.

The disc drive 300 may be similar to, the same as, or different from the optical disc drive 120. The disc drive 300 may be or represent a disc drive in various systems 100, such as in an automobile or other vehicle, a computer system, a home entertainment system, or in various other systems 100. The disc drive 300 may, for example, be a CD-drive, a DVD-drive, a BD-drive, or various other drives configured or operable to read from or write to an optical storage media. The components of the disc drive 300 which are the same or similar to the respective components in the disc drive 200 may be referred to by the same number.

The disc drive 300 may include a central processing module 370 (sometimes referred to as "glue logic" or a "conversion unit"). The central processing module 370 may be created with or include a Field Programmable Gate Array ("FPGA"), a specialized circuit, or various other hardware or circuitry. The central processing module 370 may be or include a translating unit. The translating unit may provide a bridge between the USB interface and a different interface of the external drive, such as a SATA interface or PATA interface. The translating unit or other component of the central processing module 370 may be or include a bridge or other integrated circuit, such as a PATA/SATA-USB bridge integrated circuit. The central processing module 370 may be or execute logic, code, instructions, or algorithms. The central processing module 370 may communicate with, or be connected to, one or more components of the disc drive 300.

The central processing module 370 may communicate with, or be connected to, a USB interface 380. The USB interface 380 may be an interface which may be connected with the host or head unit 130. The USB interface 380 may enable or facilitate data communication between the head unit or host 130 and the disc drive 300.

The central processing module 370 may also or alternatively communicate with, or be connected to, the drive controller 220. The drive controller 220 may have or include a communication line 225, which may be or include one or more SATA or PATA cables, and may transmit data using one or more SATA or PATA formats.

The central processing module 370 act as an intermediary between the USB interface 380 and the drive controller 220 of the disc drive 200. As an example, the central processing module 370 may provide a wake-up signal or a start-up signal to the USB interface 380, such as when triggered by a disc-in switch 210.

The central processing module 370 may also or alternatively perform data conversion between the SATA/PATA interface 225 of drive controller 220 and a USB interface 380. The central processing module 370 may communicate with, transmit to, or receive data from the host 130 through the USB interface 380, and may communicate any necessary data from the host 130 to the drive controller 220.

For example, the central processing module 370 may receive, through or via the data communication path 385 of the USB interface 380, a command or instruction from the head unit or host 130, such as a hardware eject command 230 and hardware reset command 240. The central processing module 370 may generate the hardware eject signal 230 and hardware reset signal 240 from the commands received through the data communication path 385. The generated signals 230 and 240 may, for example, be created or converted into a format understandable or receivable by the drive controller 220, such as an ATA format. The central processing module 370 may then transmit or communicate the hardware eject signal 230 or hardware reset signal 240 to the drive controller 220.

The central processing module 370 may also or alternatively be in communication with, or be connected to, a power connector 390. The power connector 390 may provide the disc drive 300 with an external power supply. The external power supply provided by the power connector 390 may be delivered from the head unit or host 130, such as in a similar manner that the power supply was provided by the interface 250 in the optical disc device 200. The power supply is labeled as "8V", "5V" and "GND" designating supply voltages of 8V and 5V and "ground" for illustrative purposes. However, various other values or amounts of power may be supplied. For example, instead of the 5V power supply, a supply voltage of around 3.3V may be used.

Power from the power connector 390 may be transmitted to or received by the central processing module 370. The central processing module 370 may distribute the power to one or more components of disc drive 300. For example, the central processing module 370 may provide power from the power connector 390 to the USB interface 380, such as by or through one or more "GND" and "5V" connections 365 and 375 with the USB interface 380. The "GND" and "5V" connections 365 and 375 may be connections established by or through the use of a USB plug. In other systems, the central processing module 370 may include one, or more than two power lines or connections to the USB interface 380.

The connection of power from the central processing module 370 and the USB interface 380 may be provided, relayed through, or rely on one or more switch unit 360. The switch unit 360 may include two separate switches 363 and 373 for two connection lines, such as a first switch 363 for a "5V" connection line 365 and a second switch 373 for a "GND" connection line 375. In other systems, the central processing module 370 may include only one switch 363, or may include more switches in a switch unit 360.

The switch unit 360 may be operable or configurable to control a power connection between the USB interface 380 and the central processing module 370. When the switches 363 and 373 of the switch unit 360 are closed, the central processing module 370 may be configured or operable to provide power to the USB interface 380 through power lines 365 or 375, and activate a data transfer with the USB interface 380, such as through a communication line 385. When the switches 363 and 373 of the switch unit 370 are open, the central processing module 370 may not power the USB interface 380, and may not activate or transfer data with the USB interface 380.

Operation of the switch unit 360, and one or more of the switches 363 and 373, may be controlled by the disc-in switch 210. If an optical disc 205 is inserted into disc drive 300, the disc-in switch 210 may be closed. When the disc-in switch 210 is closed, the switch unit 360 may also be configured or controlled to be closed. When the switch unit 360 is closed, the central processing module 370 may be configured or operable to power or activate the USB interface 380. When the USB interface 380 is powered, the central processing module 370 may be configured or operable to communicate with and control the USB interface 380 and communicate with the host 130.

If alternatively it no optical disc 205 is in the optical disc drive 300, the disc-in-switch 210 may be open. When the disc-in switch is open, the switch unit 360 may also be configured or controlled to open. When the switch unit 360 is open, the central processing module 370 may deactivate, switch off, or not power the USB interface 380.

The disc drive 300 may additionally or alternatively be operable to power the drive controller 220 depending on whether or not a disc is inserted into the disc drive 300. When no disc is inserted or present in the disc drive 300, the disc-in switch 210 may be open, the switch unit 360 may be open, and no power may be provided to the USB interface 380. When no power is provided to the USB interface 380, the USB interface 380 may be deactivated. The host 130 may monitor or otherwise detect that the USB interface 380 is not activated or not powered, and may interpret the USB interface 380 as not being connected to any device, such as the disc drive 300. The host 130 may not provide any power to the disc drive 300 through the power connector 390, as the host 130 may not recognize that the disc drive 300 is connected to the USB interface 380 or may detect that the disc drive 300 is off or not activated.

When a disc 205 is inserted into the disc drive 300, the disc-in switch 210 may be closed, the switch unit 360 may be closed, and power may be provided to the USB interface 380, such that the USB interface 380 may be activated. When activated, the host 130 may detect, such as with the HotPlug capability of the USB interface 380, that the disc drive 300 is connected with the USB interface 380, or that the disc drive 300 as being activated or otherwise in need of power. The host 130 may provide power to the disc drive 300 through the power connector 390 in accordance with the activation of the USB interface 380. The HotPlug capability of a USB interface 380 may enable the host 130 to automatically recognize when the USB interface 380 has been activated, or when to provide power to the disc drive 300.

The disc-in switch 210 of the disc drive 300 may include or be made up of a mechanical switch. The use of a mechanical switch for the disc-in switch may be advantageous as it may detect the presence of an optical disc 205 in a state where part or all of the disc drive 300 is deactivated does not receive or have power supplied.

By switching the power supply provided by the central processing module 370 to the USB interface 380, the disc drive 300 may enable and achieve a USB interface 380 that is only activated or otherwise powered when an optical disc 205 is inserted in the disc drive 300. Such functionality may be useful in various systems, such as compact disc drives in vehicles, where it may be desirable to activate the power consuming functions of the disc drive as well as of the host only when desired.

Figure 4:
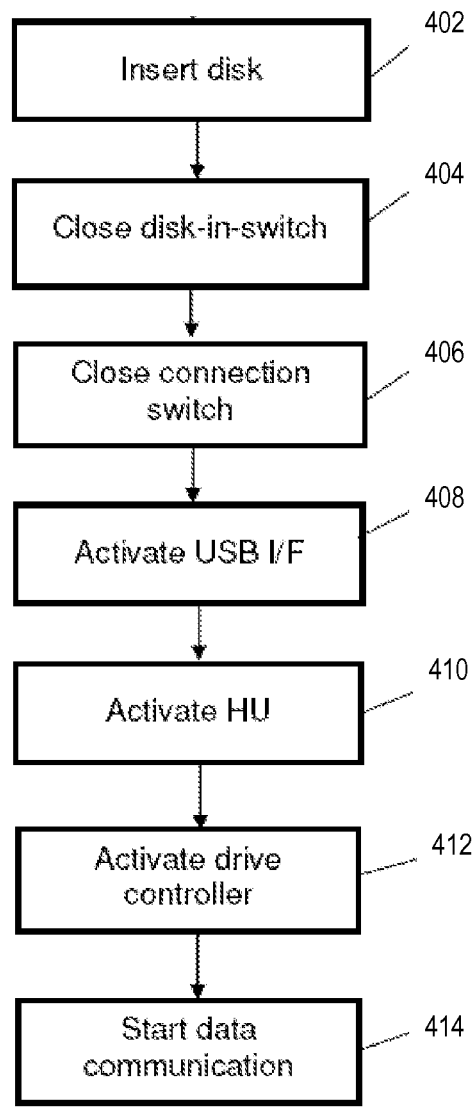
FIG. 4 is a flow diagram of an example method of activating a disc drive.

FIG. 4 is a flow diagram of an example method of operation of a disc drive. The method of FIG. 4 may show how a disc drive, such as the disc drive 300, may operate to turn on or otherwise be activated.

The method may begin when the disc drive 300 is not activated or powered and when no disc is interested in the disc drive 300. The disc-in switch 210 of the disc drive 300 may be open. The switching unit 360 of the disc drive 300 may also be open. As the disc drive 300 may not be activated, the host 130 may not detect any device to be present at the USB interface 380.

The method may begin with the insertion of an optical disc 205 into the optical disc device 300, at block 402. At block 404, when the optical disc 205 is inserted into the disc drive 300, the disc-in switch 210 may be closed.

Closing the disc-in switch 210 may control the switching unit. Accordingly, at block 406, the switches 363 and 373 of the switching unit 360 may be closed in response to the closed disc-in switch 210.

Closing the switching unit 360 may establish a power connection between central processing module 370 and the USB interface 380. At block 408, the USB interface 380 may be activated and may receive power from the central processing module 370.

One or more capabilities of the USB interface 380 may be utilized or leveraged to turn on the host or head unit 130. For example, a HotPlug capability of a USB interface of the host 130 may enable the host 130 to recognize that a device (the disc drive 300) is connected via the USB interface 380. At block 410, where the host or head unit 130 has been inactive or otherwise in a standby state, the host 130 becomes activated.

Additionally or alternatively, at block 412, the drive controller 220 of disc drive 300 may activated. For example, the drive controller 220 may be activated by initiating a provision of power, such as the 8V, via or using the power connector 390 to establish the drive controller 220.

After some or all components of the optical disc device 300 have been activated, the method may proceed to block 414 and the central processing module 370 may begin or otherwise start data communications. Data may be communicated between the central processing module 370 and the host 130 using a communication line 385 connected with the USB interface 380.

In some variations, the blocks or logic of FIG. 4 may include fewer or more blocks or functions. In some variations, one or more blocks may perform different functions, or one or more blocks may be combined into fewer functions or determinations. In some variations, one or more blocks or functions may be performed in a different order or at the same time. Various other examples and variations of logic are possible.

Figure 5:
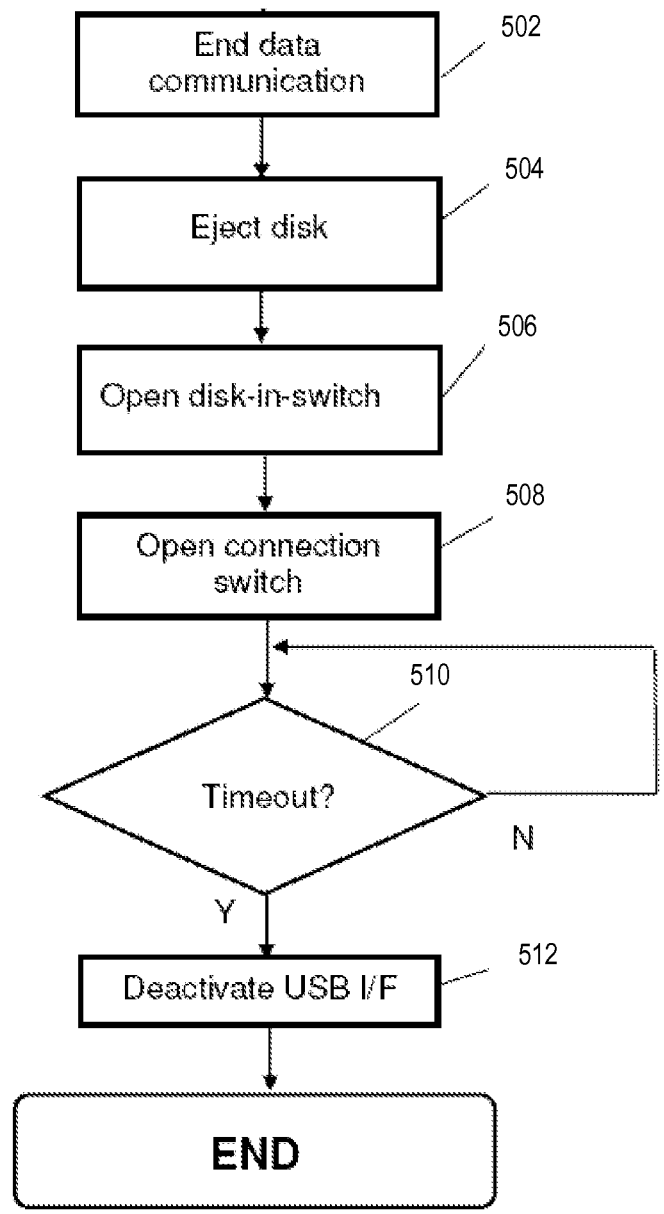
FIG. 5 is a flow diagram of an example method of deactivating a disc drive.

FIG. 5 is a flow diagram of an example method of operation of an optical disc drive. The method of FIG. 5 may show how an optical disc drive, such as the disc drive 300, may operate to turn off or otherwise be deactivated.

The method may begin when the disc drive 300 is activated or powered and when a disc is presently running in the disc drive 300. The disc-in switch 210 of the disc drive 300 may be closed. The switching unit 360 of the disc drive 300 may also be closed. As the disc drive 300 may be activated, the host 130 may detect and communicate with the disc drive 300 through the USB interface 380.

The disc drive 300 may be deactivated at various times, such as when the optical disc 205 is removed or ejected. Disc drive ejection may be initiated by a user upon a respective operation, such as by pressing an eject button on the operation panel of the dashboard.

When an ejection is triggered or initiated, data communication between disc drive 300 and the head unit or host 130 is terminated or otherwise ends (if it has not been finished before, for example, by having reached the end of an optical disc to be played back). This may occur at block 502.

After ceasing any data communications, the method may proceed to block 504. At block 504, the optical disc 205 may be ejected from the disc drive 300.

In response to the ejection of the optical disc 205, the method may proceed to block 506, where the disc-in switch 210 may be opened. Additionally, at block 508, the switch unit 360, which may be controlled by the disc-in switch 210, may be controlled to be opened.

Opening of switch 360 may initiate deactivation of USB interface 380 and deactivation or powering down of the disc drive 300. For example, the central processing module 370 may no longer provide power to the USB interface 380. The host 130 may detect that the USB interface 380 is no longer powered. In some systems, the host 130 may no longer detect the disc drive 300, and may stop providing power to the central processing module 370 through the power connector 390.

Deactivation of USB interface 380 may, in some methods, be delayed by a predetermined time ("timeout"). In block 510, the optical disc device 300 or the host 130 may determine whether a predetermined amount of time (the timeout time) counted by a timer has been expired after connection switch unit 360 has been opened. As long as the predetermined time has not yet expired, the USB interface 380 may remain active and the disc drive 300 activated and powered. The method may repeat the functions of block 510 until the predetermined time (the timeout) has expired since the opened connection in the switching block 360.

At block 510, when the predetermined time has expired, the method may proceed to block 512. At block 512, the USB interface 380 may be deactivated. The optical disc device 300 may also or alternatively be deactivated or powered down.

By means of the timeout function, when the time period of the timeout is set to a reasonable value, the system 100 may avoid deactivating and quickly re-activating the disc drive 300 and the connected components, such as when a user is performing a disc change. In these situations, deactivating the USB interface 380 or the disc drive 300 may not be intended or desirable.

In some variations, the blocks or logic of FIG. 5 may include fewer or more blocks or functions. For example, in some variations, the method of FIG. 5 may skip block 510 and proceed directly from block 508 to block 512. In some variations, one or more blocks may perform different functions, or one or more blocks may be combined into fewer functions or determinations. In some variations, one or more blocks or functions may be performed in a different order or at the same time. Various other examples and variations of logic are possible.

The disc drive 300 may additionally or alternatively be configured or operable to provide one or more of a hardware eject command or a hardware reset command to the drive controller 220 through a serial or parallel ATA interface. In order to enable host-controlled hardware eject and hardware reset functionality for the disc drive 300 connected to the host 130 by a USB interface 380, the central processing module 370 may be configured to convert commands received via the USB interface 380 into the respective hardware signal to be forwarded to drive controller 220 having a serial or parallel ATA interface.

Figure 6:
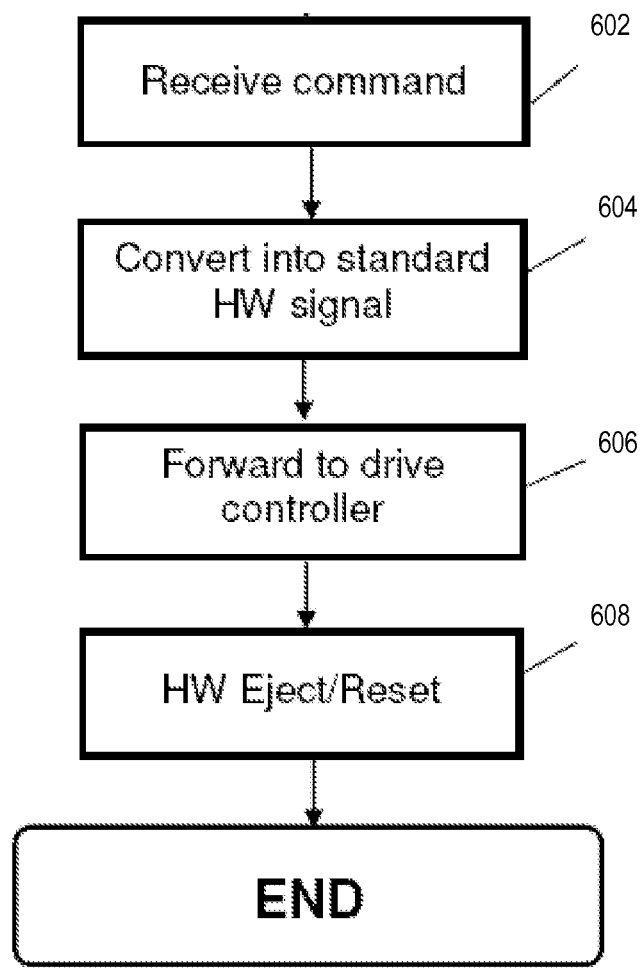
FIG. 6 is a flow diagram of an example method of ejecting or resetting hardware of a disc drive.

FIG. 6 is a flow chart of an example method of delivering a hardware eject command or a hardware reset command to a drive controller 220 of a disc drive 300. The method may begin at block 602, where the central processing module 370 may receive a command from the host or head unit 130. The command received by the central processing module 370 may be a hardware eject command or a hardware receive command. The command may be received or accessed by or through the USB interface 380 between the central processing module 370 and the host 130.

Upon receiving the command, the method may proceed to block 604, where the central processing module 370 may convert the command into a hardware signal. The central processing module 370 may, for example, evaluate the received commands and generates a logical signal of a high/low level (H/L signal). The localized H/L signal may be generated at specialized pins designated for hardware signals, such as for hardware eject or hardware reset signals. The central processing module 370 may, through a special connection, forward the respective signals to the drive controller 220.

At block 606, the drive controller 220 may receive the signals. The signals generated by the central processing module 370 and received by the drive controller 220 may be similar or the same as the signals received by the drive controller 220 directly from the interface 250 in the disc drive 200. The signals may appear to the drive controller 220 to have been sent directly to the drive controller 220 from the interface 250, and the drive controller 220 may not know or be aware that the central processing module 370 may have generated the signals.

At block 608, the drive controller 220 may initiates a function or action according to the received signal. For example, the drive controller 220 may initiate an ejection of the optical disc 205 when the hardware eject signal is received from the central processing module 370, or may initiate a hardware reset when the hardware reset signal is received from the central processing module 370. Other variations are possible.

The systems and methods described may provide an optical disc drive that may be used in an automotive industry or vehicle. The optical disc drive, such as optical disc drive 300, may conduct data communication with a host 130 via a USB interface 380. The optical disc drive 300 may perform drive activation upon insertion of a disc automatically by controlling a power supply to the USB interface 380, such as by means of a disc-in switch 210. The optical disc drive 300 may enable the host 130 of a system 100 to detect an insertion of an optical disc 205 into the optical disc drive 300 connected using a USB interface 380, and thus enable or initiate a wake-up process or start-up process for the host or head unit 130, without disconnecting and connecting the USB connection between the optical disc drive 300 and the host 130. The optical disc drive 300 may maintain a useful an advantageous functionality, such as with automotive disc drives having parallel or serial ATA interfaces, using a USB interface and connection. While ATA connectors have 30 to 50 pins, and additional lines are necessary for disc-in switches 210, a USB interface may only have 4 pins. By using a USB interface 380, the optical disc drive 300 may further enable and result in a reduction in the number of necessary hardware wirings for control and operation of the optical disc drive 300.

One or more components of a system 100, such as a disc drive 120, 200, or 300, a central processing module 370, a drive controller 220, or a host 130, may encompass hardware, software, firmware, and implementations with combinations of hardware, software, or firmware. For example, one or more components of a system 100, such as a disc drive 120, 200, or 300, a central processing module 370, a drive controller 220, or a host 130 may include or be implemented as dedicated hardware implementations, such as application specific integrated circuits, programmable logic arrays and other hardware devices. Applications that may include the apparatus and systems may broadly include a variety of electronic and computer systems. One or more examples described may implement functions using two or more specific interconnected hardware modules or devices with related control and data signals that can be communicated between and through the modules, or as portions of an application-specific integrated circuit.

Additionally or alternatively, one or more components of a system 100, such as a disc drive 120, 200, or 300, a central processing module 370, a drive controller 220, or a host 130, may be or include part or all of a processor, computing device, or computer system ("computer system"). The computer system may include or be part of CPU, a graphics processing unit ("GPU"), a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data.

The computer system may include a memory. The memory may be a main memory, a static memory, or a dynamic memory. The memory may include computer readable storage media such as various types of volatile and non-volatile storage media, including random access memory, read-only memory, programmable read-only memory, electrically programmable read-only memory, electrically erasable read-only memory, flash memory, magnetic tape or disk, and optical media. The memory may be operable to store instructions executable by the processor. One or more of the functions, acts or tasks described may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination.

A computer readable medium or machine readable medium may include any non-transitory memory device that includes or stores software for use by or in connection with an instruction executable system, apparatus, or device. Computer readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A computer readable memory may also include a non-transitory tangible medium upon which software is stored. The software may be electronically stored as an image or in another format (such as through an optical scan), then compiled, or interpreted or otherwise processed. The term "computer-readable medium" may include a single medium or multiple media, such as a centralized or distributed database, and/or associated caches and servers that store one or more sets of instructions. The term "computer-readable medium" may include any medium that is capable of storing, encoding or carrying a set of instructions for execution by a processor or that cause a computer system to perform any one or more of the methods or operations disclosed. The "computer-readable medium" may be non-transitory, and may be tangible.

The computer system may implement a software program, such as code generated manually or programmed. The computer system may include a set of instructions that can be executed to cause the computer system to perform any one or more of the methods or computer based functions disclosed.

The computer system may operate as a standalone device or may be connected, such as using a network, to other computer systems or peripheral devices. The computer system may be, or may be implemented using, electronic devices that provide voice, audio, video or data communication. The term "system" may include any collection of systems or sub-systems that individually or jointly execute a set, or multiple sets, of instructions to perform one or more computer functions.

The disc drives, such as disc drive 300, and the methods of operation of the disc drives, may be beneficial and advantageous in various ways. The disc drive 300 may represent an optical disc drive for a vehicle, which may be connectable to a distant head unit. The disc drive 300 may enable an automatic activation of the disc drive 300 and USB interface 380 upon the insertion of a disc.

The optical disc drive 300 may include a USB interface 380 for connecting the optical disc drive 300 with a head unit 130. The optical disc drive 300 may also include a disc-in switch 210 for detecting that an optical disc 205 is inserted into the optical disc drive 300. The optical disc drive 300 may include an internal power connection for providing power from a power connector 390 of the optical disc drive 300 to the USB interface 380, and a connection switch 360 for electrically connecting and disconnecting the internal power connection. The connection switch 360 may be controlled by the disc-in switch 210 so as to activate the USB interface 380 upon the insertion of an optical disc 205.

The optical disc drive 300 may be activated for use in a vehicle. The optical disc drive 300 may be connected to the head unit 130 via a USB interface 380. An optical disc 205 may be inserted into the optical disc drive 300, activating a disc-in switch 210 that detects an optical disc 205 inserted into the optical disc drive 300. When the disc-in switch is closed, a connection switch 360 of an internal power connection for providing power from a power connector 390 of the optical disc drive 300 to the USB interface 380 may be closed. The connection switch 360 may be controlled by the disc-in switch 210. The USB interface 380 may be activated by closing the connection switch 360. Data communication between the optical disc drive 300 and the head unit 130 may be started once the USB interface 380 is activated.

The optical disc drive 300 connected to a host 130 via a USB interface 380 may have disc-in detection functionality. Accordingly, usage of a USB interface 380 for connecting an optical disc drive 300 may be possible in a vehicle where a disc detection function is desirable. The system 100 with an optical disc drive 300 may achieve the disc detection functionality by controlling a power connection switch 360 for supplying the USB interface 380 with power by means of a disc-in switch 210.

The optical disc drive 300 may include a drive controller 220 with a serial or parallel ATA interface and a conversion unit 370 for signal conversion between the serial or parallel ATA interface and the USB interface 380. The power connector 390 may be connected to the conversion unit 370 to provide the disc drive 300 with power. Power may be supplied to the USB interface 380 by means of the internal power connection (such as power lines 365 and 375) connecting the USB interface 380 to the conversion unit 370. The conversion unit 370 may enable the connection of the disc drive 300 with a drive controller 220 having an ATA interface with a head unit 130 using USB.

The internal power connection of the USB interface may include a line 365 for providing a particular predetermined voltage to the USB interface and a line 375 connected to ground. In some systems, the predetermined voltage is 5V. The system may, however, use other voltage values.

The disc-in-switch 210 may control the connection switch so as to deactivate the USB interface 380 when the optical disc 205 is ejected from the optical disc drive 300. Since no data communication between the optical disc drive 300 and the head unit 130 may be necessary when there is no disc 205 in the disc drive 300, power consumption may thereby be reduced, without any additional control operations by a user (or driver, in vehicular systems) being necessary. The head unit 130 may detect that there is no active optical disc drive 300 connected, and may switch off power connection with the optical disc drive 300. The activation upon ejection of an optical disc 205 may be delayed by a predetermined timeout. The timeout may be measured by a timer included in the optical disc drive 300. A deactivation timeout may avoid a deactivation and subsequent reactivation in the case of another disc 205 being inserted shortly after disc ejection, such as in a disc change procedure.

The conversion unit 370 may convert a command for emergency ejection of an optical disc 205 received from the head unit 130 via the USB interface 380 into a hardware eject signal of the parallel or serial ATA interface of the drive controller 220. The conversion unit 370 may also convert a command for initiating a hardware reset of the optical disc drive 300 received from the head unit 130 via the USB interface 380 into a hardware set signal of the parallel or serial ATA interface. In this way, hardware eject and/or hardware reset function, controlled by the host 130, can be provided for the optical disc drive 300 connected via USB, although USB does not provide specialized electrical lines for those signals.

The head unit 130 may itself be activated from an inactive state, upon activating the USB interface 380. For instance, a disc 205 may be inserted into the optical disc drive 300 in a state where a vehicle radio apparatus and a head unit 130 are switched off. In some systems, the head unit 130 may be automatically activated when the disc is inserted, without desiring any further operational handling that could otherwise distract the driver. The term "deactivated state" or closely related terms may include any state in which the respective unit is not being actively operated, such as a switched-off state or a standby state. The power supply to the drive controller 220 of the optical disc drive 300 may be automatically activated upon activating the head unit or host 130. Activation of the USB interface 380 may thus serve to activate the whole optical disc drive 300 via the head unit or host 130.

The present system provides an automotive optical disc drive, where data communication to a host may be performed via USB and drive activation upon insertion of a disc may be automatically performed by controlling power supply to the USB interface by means of a mechanical disc-in switch. The system may be enabled to maintain a specific functionality of automotive disc drives having parallel or serial ATA interfaces in case of data communication via USB. The system may also enable reductions in the number of required hardware wirings.

The term "module" may be defined to include a number of executable modules. The modules may include software, hardware or some combination thereof executable by a processor, such as processor. Software modules may include instructions stored in memory that may be executable by the processor or other processor. Hardware modules may include various devices, components, circuits, gates, circuit boards, and the like that are executable, directed, and/or controlled for performance by the processor.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A disc drive, comprising:
   a receiver;
   a disc switch configured to detect insertion of a disc into the receiver;
   a universal serial bus ("USB") interface configured to communicate with a head unit when power is provided to the USB interface; and
   a power connector configured to provide the power to the USB interface when the disc switch detects the disc inserted into the receiver, and not provide the power to the USB interface when the disc switch does not detect the disc inserted into the receiver.

2. The disc drive of claim 1, where the power connector comprises a connection switch configured to electrically connect and disconnect the power connector; and
   where the disc switch is further configured to control the connection switch so the power connector provides the power to the USB interface in response to the disc being inserted into the receiver.

3. The disc drive of claim 2, where the disc switch is further configured to control the connection switch so the power connector stops providing the power to the USB interface when the disc is ejected from the receiver by the disc drive.

4. The disc drive of claim 3, where the power connector is configured to continue to provide the power to the USB interface for a predetermined time period after the disc is ejected from the receiver before the power connector stops providing the power to the USB interface.

5. The disc drive of claim 1, further comprising:
   a drive controller having an Advanced Technology Attachment ("ATA") interface; and
   a conversion unit configured to convert signals from the USB interface to an ATA format for receipt at the ATA interface.

6. The disc drive of claim 5, where the power connector is connected to the conversion unit and connects the conversion unit and the USB interface.

7. The disc drive of claim 5, where the ATA interface is a serial ATA interface or a parallel ATA interface.

8. The disc drive of claim 5, where the conversion unit is configured to convert an emergency ejection command from the USB interface into a hardware eject signal and transmit the hardware eject signal to the ATA interface, the emergency ejection command sent from the head unit and initiating an ejection of the disc from the disc drive.

9. The disc drive of claim 5, where the conversion unit is configured to convert a hardware reset command from USB interface into a hardware reset signal and transmit the hardware reset signal to the ATA interface, the hardware reset command sent from the head unit and initiating a hardware reset of the disc drive.

10. The disc drive of claim 5, where the conversion unit comprises a field programmable gate array.

11. The disc drive of claim 1, where the power connector is connected to the USB interface through a first power line providing a predetermined voltage and a second line connected to ground.

12. A method of activating a disc drive, comprising:
    detecting, with a disc switch, when a disc is inserted into the disc drive;
    providing power to a universal serial bus ("USB") interface when the disc switch detects that the disc is inserted into the disc drive, the USB interface connected with a head unit; and
    communicating data between the disc drive and the head unit through the USB interface when the USB interface receives power.

13. The method of claim 12, further comprising activating the head unit when the USB interface receives power.

14. The method of claim 13, further comprising activating a power supply to a drive controller of the disc drive when the head unit is activated.

15. The method of claim 12, further comprising:
    detecting, with the disc switch, when the disc is ejected from the disc drive; and
    deactivating the USB interface by not providing power to the USB interface when the disc switch detects that the disc is ejected from the disc drive.

16. The method of claim 15, further comprising waiting a predetermined time after the disc switch detects the disc is ejected from the disc drive before deactivating the USB interface.

17. The method of claim 12, further comprising:
    receiving, from the USB interface, an emergency ejection command sent by the head unit;
    converting the emergency ejection command into a hardware eject signal using a conversion unit, the conversion unit for converting signals between the USB interface and an Advanced Technology Attachment ("ATA") interface of a drive controller of the disc drive; and
    communicating the hardware eject signal to the ATA interface of the drive controller.

18. The method of claim 17, further comprising ejecting the disc from the disc drive when the hardware eject signal is communicated.

19. The method of claim 12, further comprising:
receiving, from the USB interface, a hardware reset command sent by the head unit;
converting the hardware reset command into a hardware reset signal using a conversion unit, the conversion unit configured to convert signals between the USB interface and an Advanced Technology Attachment ("ATA") interface of a drive controller of the disc drive; and
communicating the hardware reset signal to the ATA interface of the drive controller.

20. A non-transitory computer readable storage medium having stored therein data representing instructions executable by a processor for controlling a disc drive, the storage medium comprising:
instructions to activate a universal serial bus ("USB") interface when a disc switch detects that a disc is inserted into the disc drive;
instructions to communicate data to a head unit through the USB interface when the USB interface is activated; and
instructions to deactivate the USB interface when the disc switch detects that the disc is ejected from the disc drive.

21. The medium of claim 20, where the instructions to activate the USB interface comprise instructions to close a power switch on a power line between the USB interface and a power connector, providing power from the power connector to the power interface.

22. The medium of claim 21, where the instructions to deactivate the USB interface comprise instructions to open the power switch.

23. The medium of claim 22, where the instructions to deactivate the USB interface include instructions to wait a predetermined time period after the disc switch detects that the disc is ejected from the disc drive before deactivating the USB interface.

24. The medium of claim 20, further comprising:
instructions to receive, from the USB interface, an emergency ejection command sent by the head unit; and
instructions to convert the emergency ejection command into a hardware eject signal for an Advanced Technology Attachment ("ATA") interface of a drive controller of the disc drive.

25. The medium of claim 20, further comprising:
instructions to receive, from the USB interface, a hardware reset command sent by the head unit; and
instructions to convert the hardware reset command into a hardware reset signal for an Advanced Technology Attachment ("ATA") interface of a drive controller of the disc drive.

* * * * *